US012730737B2

(12) United States Patent
Bannenberg et al.

(10) Patent No.: US 12,730,737 B2
(45) Date of Patent: Sep. 8, 2026

(54) COMPUTER-IMPLEMENTED METHOD FOR SCENARIO-BASED TESTING AND / OR HOMOLOGATION OF AT LEAST PARTIALLY AUTONOMOUS DRIVING FUNCTIONS TO BE TESTED BY MEANS OF KEY PERFORMANCE INDICATORS (KPI)

(71) Applicant: dSPACE GmbH, Paderborn (DE)

(72) Inventors: Sebastian Bannenberg, Paderborn (DE); Steffen Beringer, Paderborn (DE); Eduard Miller, Paderborn (DE); Markus Deppe, Paderborn (DE)

(73) Assignee: dSPACE GmbH, Paderborn (DE)

( * ) Notice: Subject to any disclaimer, the term of this patent is extended or adjusted under 35 U.S.C. 154(b) by 1119 days.

(21) Appl. No.: 17/735,215

(22) Filed: May 3, 2022

(65) Prior Publication Data

US 2022/0358024 A1 Nov. 10, 2022

(30) Foreign Application Priority Data

May 4, 2021 (DE) ..................... 10 2021 111 462.4

(51) Int. Cl.
*G06F 11/34* (2006.01)
*G06F 11/3668* (2025.01)

(52) U.S. Cl.
CPC ...... *G06F 11/3428* (2013.01); *G06F 11/3457* (2013.01); *G06F 11/3688* (2013.01)

(58) Field of Classification Search
CPC ............. G06F 11/3428; G06F 11/3457; G06F 11/3688
USPC .............................................................. 703/8
See application file for complete search history.

(56) References Cited

U.S. PATENT DOCUMENTS 9,130,860 B1 * 9/2015 Boe ........................ G06F 16/903
9,413,890 B2 * 8/2016 McCormack .... G06Q 10/06398
9,584,374 B2 * 2/2017 Bingham .............. G06F 16/903
9,960,970 B2 * 5/2018 Choudhary ........... G06F 16/951
10,289,782 B1 * 5/2019 Khanna ................ G06Q 10/063
(Continued)

FOREIGN PATENT DOCUMENTS

CN 108255151 A 7/2018
CN 112148615 A 12/2020
DE 102017200180 A1 7/2018
WO WO2020079698 A1 4/2020
WO WO2020213371 A1 10/2020

OTHER PUBLICATIONS

Barbier et al. ("Validation of Perception and Decision-Making Systems for Autonomous Driving via Statistical Model Checking", HAL open science, 2019, pp. 1-8) (Year: 2019).*
(Continued)

*Primary Examiner* — Iftekhar A Khan
(74) *Attorney, Agent, or Firm* — Muncy, Geissler, Olds & Lowe, P.C.

(57) ABSTRACT

A computer-implemented method for the evaluation of simulations and/or test cases in scenario-based testing and/or homologation of at least partially autonomous driving functions to be tested by key performance indicators (KPI), wherein KPIs are mapped by KPI plug-ins and KPI plug-ins are selected dynamically and reusably for simulations and/or test cases and wherein at least one KPI plug-in is selected by a KPI plug-in mechanism for purposes of simulation and/or test definition and is automatically executed in the execution by the KPI plug-in mechanism.

20 Claims, 5 Drawing Sheets

(56) References Cited

U.S. PATENT DOCUMENTS

| | | | | |
|---|---|---|---|---|
| 11,643,104 B2* | 5/2023 | Ustunel | G06V 20/56 | 382/104 |
| 2003/0061348 A1* | 3/2003 | Jacobs, Jr. | H04L 69/329 | 709/225 |
| 2005/0091093 A1* | 4/2005 | Bhaskaran | G06Q 10/06393 | 705/7.39 |
| 2011/0153368 A1* | 6/2011 | Pierre | G06Q 10/067 | 715/848 |
| 2013/0013677 A1* | 1/2013 | Engstrom | H04L 67/12 | 715/735 |
| 2016/0103909 A1* | 4/2016 | Bhide | G06F 16/903 | 707/722 |
| 2017/0004263 A1* | 1/2017 | Glidewell | G06Q 10/06393 | |
| 2017/0277837 A1* | 9/2017 | Glidewell | G16H 40/20 | |
| 2019/0303759 A1* | 10/2019 | Farabet | G06N 3/063 | |
| 2020/0202277 A1* | 6/2020 | Zhu | G06Q 10/06395 | |
| 2021/0078590 A1* | 3/2021 | Cai | B60W 50/06 | |
| 2021/0142073 A1* | 5/2021 | Ustunel | G06V 20/56 | |
| 2021/0294944 A1* | 9/2021 | Nassar | G06F 11/3684 | |
| 2022/0229954 A1* | 7/2022 | Mittal | G06F 30/20 | |
| 2022/0340149 A1* | 10/2022 | Nister | B60W 50/0205 | |

OTHER PUBLICATIONS

Pereira et a. (“Dynamic Monitoring of Key-Performance Indicators in Industrial Environments”, IEEE, 2017, pp. 1129-1134) (Year: 2017).*

Thomas Ponn et al: “Identification of Challenging Highway-Scenarios for the Safety Validation of Automated Vehicles Based on Real Driving Data,” 2020 Fifteenth International Conference on Ecological Vehicles and Renewable Energies, Accessed Dec. 15, 2020 from IEEE Xplore.

Davide Gagliardi et al: “Outcome oriented evaluation of autonomous driving functions,” 2018 IEEE Conference on Decision and Control, Dec. 17-19, 2018, pp. 6970-6975, Accessed Dec. 15, 2020 from IEEE Xplore.

Christian Berger; “Automating acceptance tests for sensor- and actuator-based systems on the example of autonomous vehicles”; Aachener Informatik-Berichte, Software Engineering, Aug. 1, 2010; ISBN: 978-3-8322-9378-9.

* cited by examiner

Fig. 3
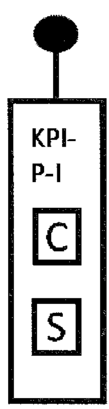
Fig. 4
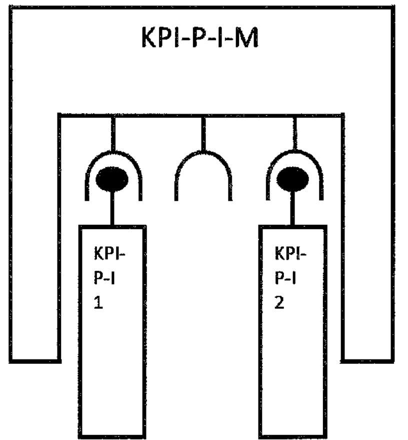
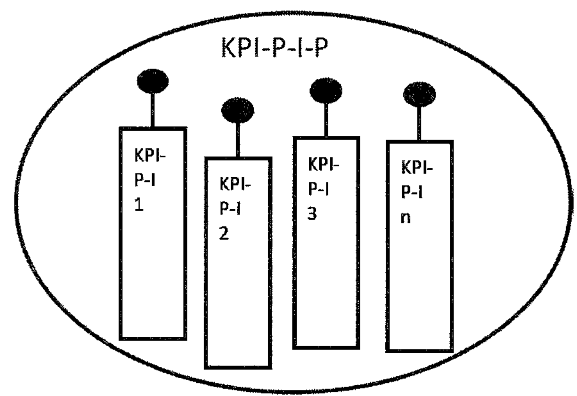

COMPUTER-IMPLEMENTED METHOD FOR SCENARIO-BASED TESTING AND / OR HOMOLOGATION OF AT LEAST PARTIALLY AUTONOMOUS DRIVING FUNCTIONS TO BE TESTED BY MEANS OF KEY PERFORMANCE INDICATORS (KPI)

This nonprovisional application claims priority under 35 U.S.C. § 119(a) to German Patent Application No. 10 2021 111 462.4, which was filed in Germany on May 4, 2021, and which is herein incorporated by reference.

BACKGROUND OF THE INVENTION

Field of the Invention

The present invention relates to a computer-implemented method for scenario-based testing and/or homologation of at least partially autonomous driving functions to be tested by key performance indicators (KPI).

The present invention further relates to a test unit for scenario-based testing and/or homologation of at least partially autonomous driving functions to be tested by key performance indicators (KPI). The present invention also relates to a computer program and a computer-readable data carrier.

Description of the Background Art

Driver assistance systems such as, e.g., adaptive cruise control and/or functions for highly automated or autonomous driving can be verified or validated using various verification methods. In particular, hardware-in-the-loop methods, software-in-the-loop methods, simulations and/or test drives can be used.

The effort involved, in particular in terms of time and/or cost, to test such vehicle functions using the above-mentioned verification methods is typically very high, as a large number of potentially possible driving situations must be tested.

For reasons of time and cost, it is not possible to test an at least partially autonomous means of transport exclusively on the road with distances of more than billions of kilometers. In addition, many redundant test kilometers would arise, while critical and unusual situations, which are relevant to the capabilities of the at least partially autonomous vehicle, might not occur.

In particular, this can lead to a high expense for test drives as well as for simulations. DE 10 2017 200 180 A1 specifies a method for the verification and/or validation of a vehicle function which is intended to autonomously guide a vehicle in the longitudinal and/or transverse direction.

The method comprises determining, based on environmental data relating to an environment of the vehicle, a test control instruction of the vehicle function to an actuator of the vehicle, wherein the test control instruction is not implemented by the actuator.

The method further comprises a simulation, based on environmental data and using a road user model with respect to at least one road user in the vicinity of the vehicle, simulating a fictitious traffic situation which would be present if the test control instruction had been implemented.

The method further includes providing test data related to the fictitious traffic situation. The vehicle function is operated passively in the vehicle to determine the test control instruction.

The disadvantage of this method is that in order to verify and/or validate the vehicle function, a vehicle actually has to be operated to be able to determine the required data.

Manufacturers of at least partially autonomous means of transport need a parallelized, simulation-based solution. This is where the test method "scenario-based testing" comes into play. It requires intelligent test follow-up, which evaluates simulation results and, if necessary, implements a modified parameterization.

SUMMARY OF THE INVENTION

It is therefore an object of the present invention to provide a method, a test unit, a computer program, and a computer-readable data carrier, which specifies an evaluation of simulations and/or test cases in scenario-based testing and/or homologation of at least partially autonomous driving functions to be tested by key performance indicators (KPI). In an advantageous embodiment of the invention, KPIs are mapped by KPI plug-ins and KPI plug-ins are selected dynamically and reusably for simulations and/or test cases. At least one KPI plug-in is selected by a KPI plug-in mechanism in the simulation and/or test definition and is automatically executed in the execution by the KPI plug-in mechanism.

The object is achieved according an exemplary embodiment of the invention by a computer-implemented method for evaluating simulations and/or test cases in scenario-based testing and/or homologation of at least partially autonomous driving functions to be tested by key performance indicators (KPI), a test unit, a computer program and a computer-readable data carrier.

An autonomous vehicle contains a variety of control units. Each individual ECU and its network must be extensively tested during development and homologation. In order to ensure the error-free functioning of the ECUs in every traffic situation, scenario-based testing is carried out. In scenario-based testing, the driving style of the vehicle is analyzed in a traffic situation that is as realistic as possible. The aspects of the traffic situation to be analyzed and their evaluation depend on the system under test. For this purpose, scenario-based testing of systems and system components for the autonomous guidance of a motor vehicle defines scenarios that can be described as an abstraction of a traffic situation. Test cases can then be executed for each scenario. A logical scenario here is the abstraction of a traffic situation with the road, the driving behavior, and the surrounding traffic, without defining concrete parameter values. By selecting concrete parameter values, the logical scenario becomes a concrete scenario. Such a concrete scenario corresponds to a single traffic situation.

For the fundamental differentiation of the traffic scenarios or scenarios in scenario-based testing according to the invention, not only static parameters, such as, for example, but not exclusively, environment, buildings or road width are used, but in particular also the driving behavior of the individual road users. The movements of the road users and thus the driving behavior are described by trajectories. Trajectories describe a path in both spatial and temporal directions. The movements of road users can be distinguished by means of parameters such as, e.g., speed.

An autonomous driving function is realized by a system, such as a control unit. The ECU is conventionally tested in real vehicles in real traffic situations, validated by hardware-in-the-loop tests or alternatively, by completely virtual tests. A simulation can also be used for this purpose.

Using the present method, for example, a so-called cut-in scenario can be distinguished from other scenarios. The cut-in scenario can be described as a traffic situation in which a highly automated or autonomous vehicle drives in a given lane and another vehicle cuts into the lane of the Ego vehicle at a certain distance at a slower speed than the Ego vehicle. The Ego vehicle here refers to the vehicle under test (SUT).

The speed of the Ego vehicle and the other vehicle, which is also referred to as the fellow vehicle, is constant. Since the speed of the Ego vehicle is higher than that of the Fellow, the Ego vehicle must be braked to avoid a collision of the two vehicles. However, a cut-in scenario can also be present in various forms, such as, e.g., by differentiating between the speeds of the road users.

Furthermore, a scenario, such as a passing-by scenario, is possible in which the Ego vehicle represents the overtaking vehicle, so that the Ego vehicle drives in a given lane and overtakes another vehicle at a slower speed than the Ego vehicle. The Ego vehicle changes/swerves into another lane and drives past the Fellow vehicle at a higher speed. The speed of the Ego vehicle does not have to be constant in this scenario. After the Ego vehicle has passed the Fellow vehicle, the Ego vehicle swerves back into the previous lane.

Such scenarios can be simulated with different parameter values. In order to use simulation and computing time as resource-saving as possible, a test follow-up is required in order to achieve a high coverage—homologation. For this purpose, an appropriate evaluation of simulation results, but if necessary also of each simulation step, must be carried out.

The term key performance indicator (KPI) refers to KPI values in the inventive method on the basis of which the progress or the degree of fulfillment with regard to important objectives or critical success factors can be measured and/or determined after or during a simulation of at least partially autonomous vehicles. KPIs and/or KPI values allow for an evaluation of the simulation and/or the simulation step for test follow-up, so that more targeted, resource-saving and time-efficient testing can be carried out.

For this purpose, KPIs according to the invention are implemented as KPI plug-ins. A KPI plug-in includes an executable script or a KPI script and a configuration description. The executable script records the method of determining the KPI value and at least specifies in the configuration description what input data the script needs, how it must be executed, and, if necessary, additional metadata that describes in which scenarios the KPI plug-in is applicable. Metadata indicating the applicability of the KPI plug-in in a scenario can be, for example, a condition for scenario parameters, such as a specific road width, or driving situation parameters, such as the number of road users or speed restrictions. This makes a KPI plug-in reusable in different scenarios and/or tests. It is not necessary to adapt the script to be executed and/or the configuration file for use in different scenarios. Thus, a KPI plug-in can be dynamically selected in test and simulation creation and/or simulation execution and integrated into tests and/or simulations and can thus be used in various simulations and/or tests in different scenarios. The selection can be made according to the invention before and/or after the test and/or simulation creation. The selection of a plug-in may vary depending on the embodiment of the invention. In a preferred embodiment, the KPI plug-in can be selected in a user interface by a test/simulation creator. In further embodiments, a programmable integration of the KPI plug-in is also possible. Further embodiments are to be included in the computer-implemented method according to the invention. By the computer-implemented method according to the invention, execution times of a simulation, including simulation creation, are shortened.

Another object of the invention is to carry out the execution of the at least one selected KPI plug-in automatically. For this purpose, a KPI plug-in mechanism is set up. With the test definition and/or simulation creation, the KPI plug-in mechanism gets the KPI plug-in. The KPI plug-in mechanism then holds the KPI plug-in and executes it at the designated location. The execution of the KPI plug-in supplies the KPI value that the KPI plug-in mechanism saves in the test and/or simulation results after execution.

The KPI plug-in mechanism is designed to run two different variants of KPI plug-ins. The variant to be executed is specified in the configuration file.

The first variant is executed online and thus simultaneously with the simulation. In this case, an evaluation takes place in each simulation step and the KPI value is available immediately after the simulation. The evaluation is based on the simulation parameters available during execution, such as scenario parameters and/or driving situation parameters.

The second variant is executed downstream of the current simulation, i.e., offline. This means that parameters are not observed real-time during the simulation and used to determine the KPI value, but instead the KPI value is determined only after the simulation. Simulation results are passed to the KPI script to determine the KPI value. Basically, the KPI plug-in mechanism can hold at least one KPI plug-in, but also several KPI plug-ins. All KPI plug-ins registered at the KPI plug-in mechanism for test execution and/or simulation are executed.

For better reusability, all KPI plug-ins are managed in a KPI plug-in pool.

In contrast to the already known methods of integrating an evaluation into scenario-based testing, the KPI plug-in mechanism manages the KPI plug-ins and their execution. As a result, the KPI plug-ins are not firmly linked to the simulation and do not have to be redefined per scenario or SUT. For already known methods, the combination of evaluation and scenario is necessary. In addition to the reusability, the automatic execution of the KPI plug-ins stands out in the inventive method. At runtime, the KPI plug-in mechanism automatically loads, checks, and executes the selected KPI plug-ins.

The KPI plug-in mechanism requires a standardized KPI configuration and standardized interfaces for KPI scripts. The specified standards allow for KPI development to be addressed separately from the scenario development.

Further embodiments of the present invention are the subject of the further subclaims and the following description with reference to the figures.

The test unit comprises an evaluator for the evaluation of simulations and/or test cases in scenario-based testing and/or homologation of at least partially autonomous driving functions to be tested by key performance indicators (KPI).

According to another aspect of the invention, a computer program with program code is further provided to carry out the method according to the invention when the computer program is executed on a computer. According to another aspect of the invention, a data carrier with program code of a computer program is provided to carry out the method according to the invention when the computer program is executed on a computer.

The features of the computer-implemented method described herein can be used to evaluate simulations and/or test cases in scenario-based testing and/or homologation of at least partially autonomous driving functions to be tested by key performance indicators (KPI). The test unit of the invention is also suitable for carrying out a test follow-up of a large number of different devices or control units of, for example, automobiles, utility vehicles and/or commercial vehicles, ships, or aircraft by an evaluation of simulation results and/or simulation steps for different scenarios or driving situations.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 is a schematic view that indicates a boundary between critical and non-critical test results;

FIG. 3 is an inventive representation of a KPI plug-in;

FIG. 4 is a schematic representation for the inventive description of the KPI plug-in mechanism and the KPI plug-in pool;

DETAILED DESCRIPTION

Figure 1:
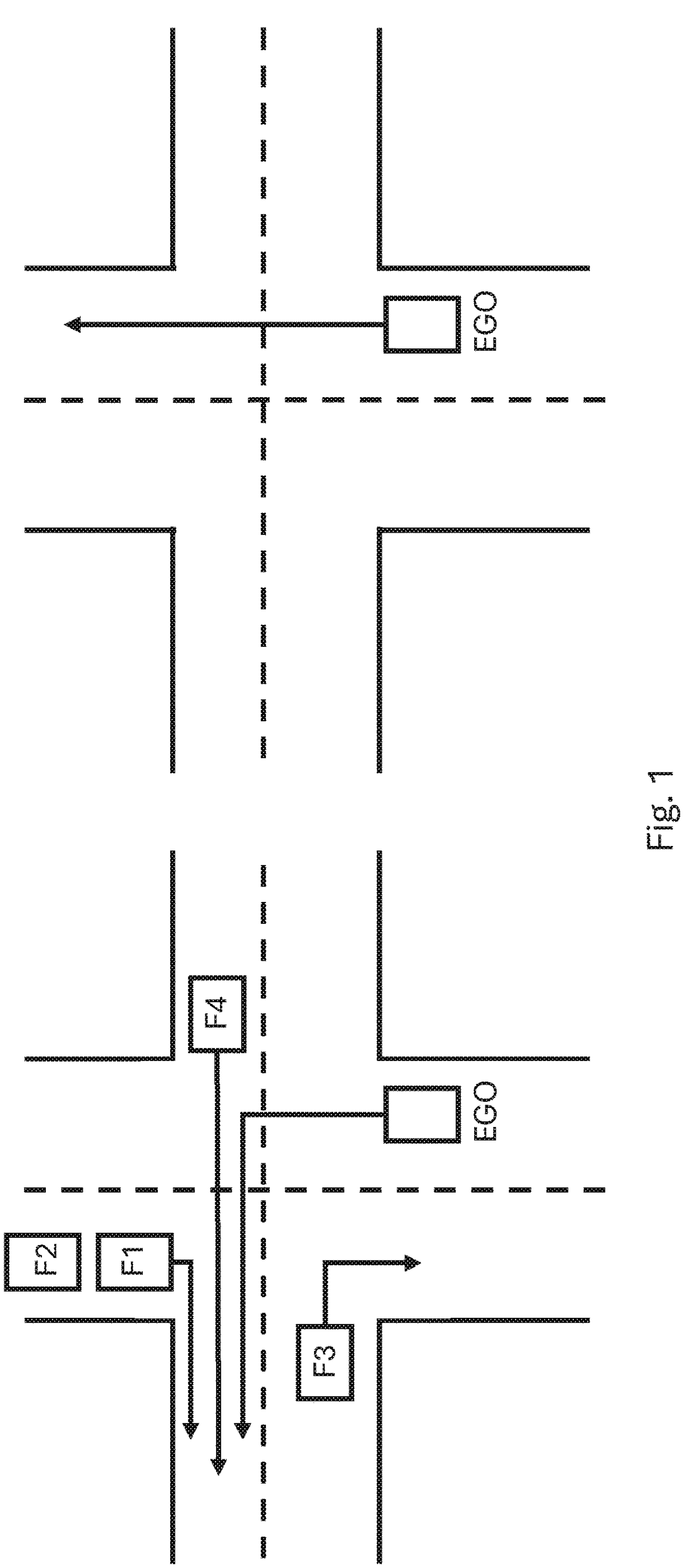
FIG. 1 is a schematic representation for the inventive differentiation between scenarios.

FIG. 1 describes two different scenarios S1 and S2. An intersection area is displayed in each case. In both scenarios S1 and S2, an Ego vehicle (Ego) is depicted. In S1, the Ego vehicle (Ego) performs a turning maneuver. The Ego vehicle is also the "Subject under Test" (SUT). Four Fellow vehicles (F1 to F4) are involved. In S2, the ego vehicle follows the vehicle course straight ahead without the participation of Fellow vehicles. Thus, there are differences in the scenario parameters as well as the driving situation parameters. The goal in the scenarios can be, for example, the testing and simulation of adaptive cruise control. In the test definition, the KPI plug-in mechanism gets the KPI plug-in for evaluating the adaptive cruise control, formed of the script and the configuration description. During and/or after the simulation, the defined KPI script is executed and the resulting KPI value is saved. It is possible to use a consistent KPI plug-in for both scenarios.

In an example, adaptive cruise control can be tested in an Ego vehicle (Ego) in scenarios on the highway and/or in the city center. In particular, a cut-in scenario may be of interest. Here, the scenarios differ in particular in the scenario parameters.

First, the highway scenario is selected in the test configuration. In the scenario, it is relevant for the Ego vehicle (Ego) whether a collision has occurred. In addition, the impact speed will determine how serious the collision was. If no collision occurs, the minimum distance between the vehicle cutting in and the Ego vehicle (Ego) having the adaptive cruise control is of interest. A KPI plug-in with specific value ranges can be defined for these specifications. The concrete implementation of the KPI plug-in takes place in a KPI script. A configuration description is created for the script, in which the evaluation is described, and the required simulation information is listed. This KPI plug-in can be implemented as an online or offline KPI plug-in. In the test definition, the KPI plug-in mechanism gets the KPI plug-in, formed of the script and the configuration description. During and/or after the simulation, the defined KPI script is executed and the resulting KPI value is saved. After the test execution of the highway scenario, the Ego vehicle (Ego) can also be tested in a second scenario, e.g., in the city center. In this case, the simulation information required for the KPI plug-in is available so that this KPI plug-in can be selected again during the test definition. This reusability is given with the use of the KPI plug-in mechanism. In addition to the described KPI plug-in for testing adaptive cruise control, other KPI plug-ins can be used that, for example, evaluate the comfort or consumption of the vehicle during the test drive and/or simulation.

FIG. 2 shows a function that indicates a boundary between critical and non-critical test results. The items shown are simulated test results. Alternatively, these can also be approximated test results.

The function shown is the safety objective function, which in a preferred embodiment has a numerical value that has a minimum value at a safety distance between the Ego vehicle (Ego) and the other motor vehicle, the Fellow vehicle, of ≥VFELLOW×0.55, has a maximum value in a collision between the Ego vehicle (Ego) and the other motor vehicle, and at a safety distance between the motor vehicle and the other motor vehicle of ≤VFELLOW×0.55 has a numerical value which is greater than the minimum value. Such a safety objective function can be part of a KPI script and can be used to determine a KPI value.

As an alternative to the safety objective function, for example, a comfort objective function or an efficiency objective function can be simulated and/or approximated, which has a numerical value which has a minimum value in the event of no change in the acceleration of the motor vehicle, has a maximum value in the event of a collision between the Ego vehicle (Ego) and the other motor vehicle, and in the event of a change in the acceleration of the Ego vehicle (Ego) has a numerical value between the minimum value and the maximum value depending on the amount of the change in acceleration. The majority of driving situation parameters, in particular the speed VEGO of the Ego vehicle (Ego) and the speed VFELLOW of the other motor vehicle, the Fellow vehicle, are generated within the given definition range, e.g., by means of a simulation.

For evaluation, such objective functions can be integrated in a KPI plug-in and selected in the test and/or simulation definition. The KPI plug-in can be executed directly in the simulation so that a KPI value can be determined.

FIG. 3 shows a representation of a KPI plug-in (KPI-P-I) according to the invention. KPI plug-ins (KPI-P-I) have an interface to the KPI plug-in mechanism. In addition, a KPI plug-in (KPI-P-I) formed of a configuration file (C) and an executable script (S).

The configuration file (C) provides information on its use, i.e., in which type of scenarios an evaluation can be done. The information can, for example, include scenario parameters and/or driving situation parameters, such as in particular the road width in the scenario and/or the number of road users and/or speed restrictions. This list is not exhaustive, it is only intended to clarify the nature of the information. In addition, the configuration file (C) determines whether the KPI plug-in (KPI-P-I) can be used online, i.e., during the simulation, or offline, after the simulation. The executable script (S) contains the information for determining a KPI value that is used to evaluate the simulation and/or a simulation step.

FIG. 4 shows a schematic representation of the description of the KPI plug-in mechanism (KPI-P-I-M) and the KPI plug-in pool (KPI-P-I-P) according to the invention.

In the KPI plug-in pool (KPI-P-I-P), all available KPI plug-ins (KPI-P-I) are collected and managed. This applies to currently used KPI plug-ins (KPI-P-I) as well as unused KPI plug-ins (KPI-P-I). All known KPI plug-ins (KPI-P-I) are available via the KPI plug-in pool (KPI-P-I-P).

The KPI plug-in mechanism (KPI-P-I-M) controls the automatic execution of the selected KPI plug-ins (KPI-P-I). In contrast to the usual methods of integrating an evaluation into scenario-based testing and thus linking it to the scenario itself, the KPI plug-in mechanism (KPI-P-I-M) manages the KPI plug-ins (KPI-P-I) and their execution. As a result, the KPIs are not permanently linked to the simulation and do not have to be redefined per scenario or SUT but instead are kept as KPI plug-ins (KPI-P-I), managed in the KPI plug-in pool (KPI-P-I-P) and executed by the KPI plug-in mechanism (KPI-P-I-M). This ensures reusability of the KPI plug-ins (KPI-P-I) and the automatic execution of the KPI plug-ins (KPI-P-I) represents a significant saving of time and resources. At runtime, the KPI plug-in mechanism (KPI-P-I-M) automatically loads, checks, and executes the selected KPI plug-ins.

Figure 5:
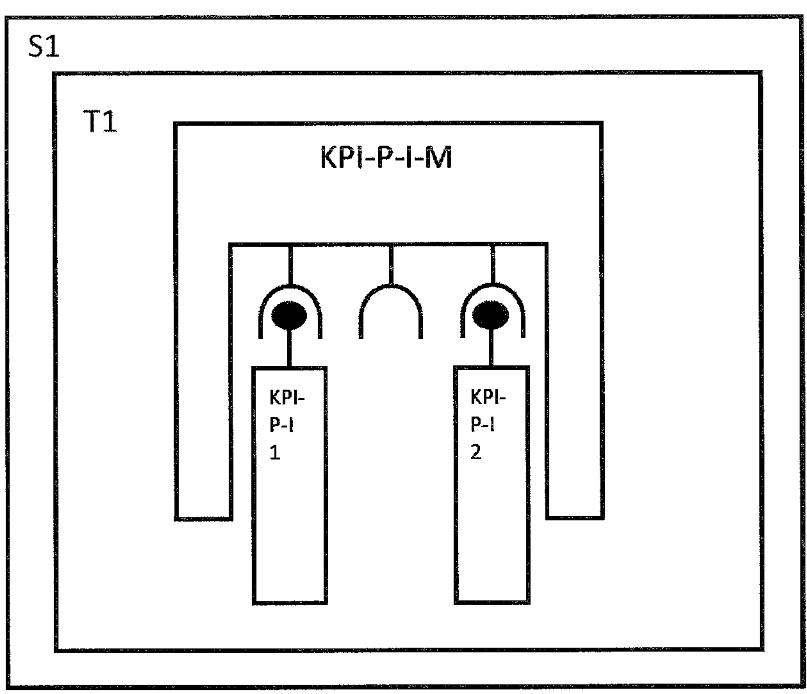
FIG. 5 is a schematic representation for the inventive description of the use of KPI plug-ins.

FIG. 5 shows a schematic representation for the description of the use of KPI plug-ins (KPI-P-I) in a concrete scenario and thus in a defined simulation/a defined test.

For this purpose, the KPI plug-in mechanism (KPI-P-I-M) is shown in FIG. 5 with two KPI plug-ins (KPI-P-I) KPI-P-I1 and KPI-P-I2. The KPI plug-in mechanism (KPI-P-I-M) is shown in conjunction with a test T1 in a scenario S1.

The KPI plug-ins (KPI-P-I) KPI-P-I1 and KPI-P-I2 are not directly linked to the scenario. Their generic and dynamic definition allows for KPI plug-ins (KPI-P-I) to be reused for various scenarios and tests. Therefore, a new KPI plug-in mechanism (KPI-P-I-M) or a new KPI plug-in (KPI-P-I) is not created for each new scenario.

Figure 6:
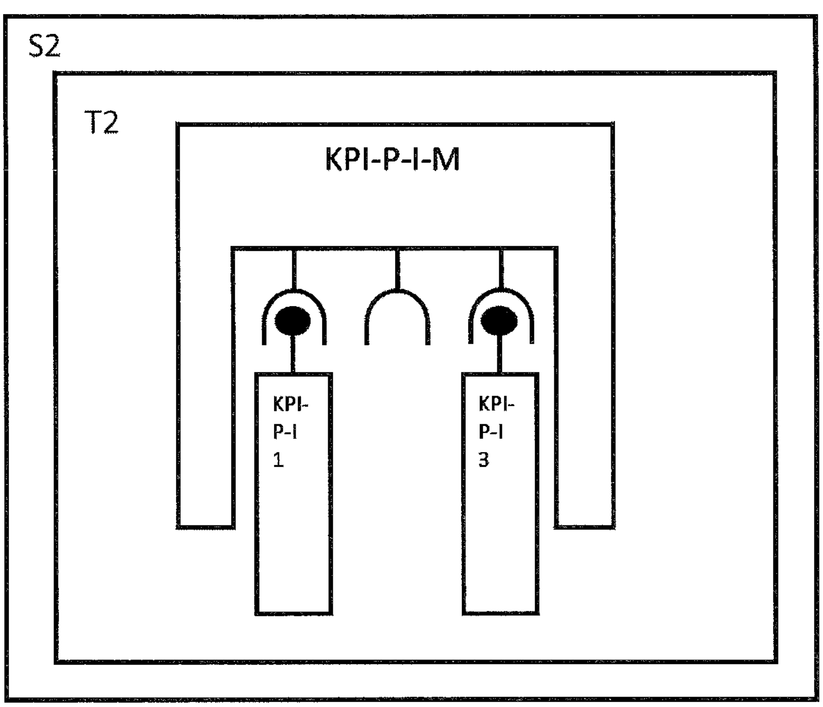
FIG. 6 is a schematic representation for the inventive description of the use of KPI plug-ins.

FIG. 6 also shows a schematic representation for the inventive description of the use of KPI plug-ins (KPI-P-I) in a concrete scenario and thus in a defined simulation/test.

Here, the KPI plug-in mechanism (KPI-P-I-M) is shown in conjunction with a test T2 in a scenario S2. FIG. 6 shows the KPI plug-in mechanism (KPI-P-I-M) with the KPI plug-ins (KPI-P-I) KPI-P-I1 and KPI-P-I3. The KPI plug-ins (KPI-P-I) are not directly linked to the scenario or test. This makes it clear that the KPI plug-in (KPI-P-I) KPI-P-I1 can be used both in S1, as shown in FIG. 5, and in S2, as shown in FIG. 6. This reuse occurs without customizing the corresponding KPI plug-in and the associated script of the KPI plug-in.

Figure 7:
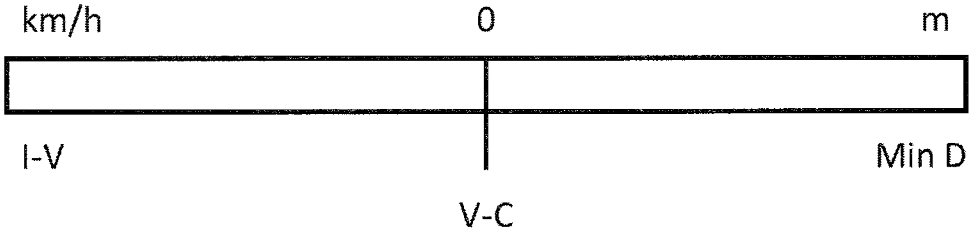
FIG. 7 is a schematic representation for the inventive determination of a KPI value.

FIG. 7 shows a schematic representation for determining a KPI value according to the invention. If the occurrence of a collision (V-C) is relevant for a scenario and for a particular SUT therein, a KPI plug-in (KPI-P-I) must be selected, such as one that evaluates the safety of the driving situation (Safety KPI). In particular, the KPI plug-in (KPI-P-I) can determine the impact velocity (I-V) in a collision (V-C) or, if no collision (V-C) occurs, indicate a minimum distance (Min D) of the Ego vehicle (Ego) and a Fellow vehicle. In particular in a cut-in scenario, in which, e.g., an adaptive cruise control is to be tested, these results are relevant for the evaluation of the scenario. The determined KPI values can be used as a basis for a new parameterization of the simulation.

Figure 8:
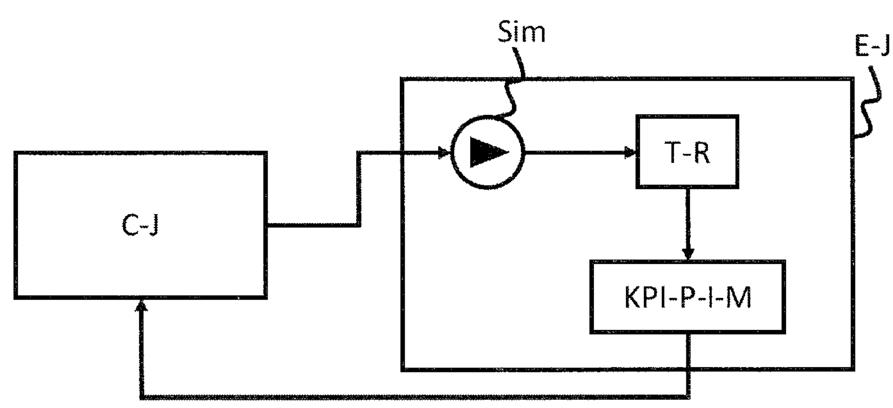
FIG. 8 shows the sequence of the inventive offline use of the KPI plug-in mechanism.

FIG. 8 shows the sequence of the offline use of the KPI plug-in mechanism (KPI-P-I-M) according to the invention.

The KPIs in the form of KPI plug-ins (KPI-P-I) can be executed online or offline by the KPI plug-in mechanism (KPI-P-I-M). In offline cases, the KPI execution, i.e., the execution of KPI plug-ins (KPI-P-I), can be carried out by the KPI plug-in mechanism (KPI-P-I-M) directly after the simulation. A KPI execution at a later stage is also possible.

First, a configuration (C-J) of jobs or test cases is made. This configuration is used in the test execution (E-J) and serves as input for the simulation (Sim). The simulation (Sim) generates test results (T-R) that are provided to the KPI plug-in mechanism (KPI-P-I-M) and used when executing the selected KPI plug-ins (KPI-P-I).

In an advantageous embodiment, results of the KPI plug-in mechanism (KPI-P-I-M) in the form of KPI values can be transferred back to the test configuration (C-J) and lead to an optimized test creation. One option is to use the KPI value for better parameter configuration so that increased test coverage can be achieved.

Figure 9:
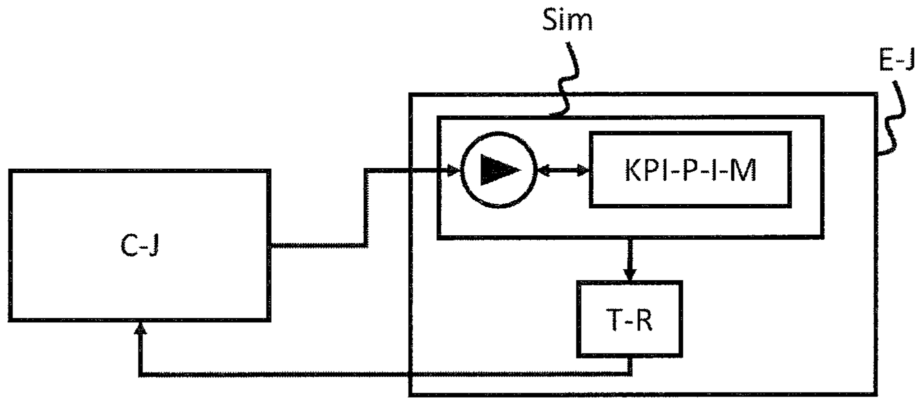
FIG. 9 shows the sequence of the inventive online use of the KPI plug-in mechanism.

FIG. 9 shows the sequence of the online use of the KPI plug-in mechanism (KPI-P-I-M) according to the invention.

For this purpose, in a preferred embodiment, information from the simulation (Sim) is transferred to the KPI plug-in mechanism (KPI-P-I-M) after each simulation step. The KPI plug-in mechanism (KPI-P-I-M) executes the selected KPI plug-ins (KPI-P-I) and transfers the KPI value directly back to the simulation (Sim). Results (T-R) including a KPI value are transferred together to the test creation and configuration (C-J) and can preferably be used to generate optimized test cases and/or an optimized parameter configuration.

The KPI plug-in (KPI-P-I) can also be used as a termination condition for the simulation (Sim). If, in a further preferred embodiment, a KPI value generated by the KPI plug-in mechanism (KPI-P-I-M) exceeds a threshold value defined in the configuration, the transfer of the KPI value in the next simulation step can cause the simulation to be aborted. The threshold value can be included in the test definition and/or in the configuration file (C) of the KPI plug-in (KPI-P-I).

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for an evaluation of simulations and/or test cases in scenario-based testing and/or homologation of at least partially autonomous driving func tions to be tested by key performance indicators (KPI), the method comprising:

mapping at least one KPI by a KPI plug-in;

selecting, dynamically and reusably, the KPI plug-in for simulations and/or test cases;

selecting at least one KPI plug-in by a KPI plug-in mechanism in the simulations and/or test cases; and automatically executing the selected KPI plug-in by the KPI plug-in mechanism, wherein the KPI plug-in is adapted to be executed:

online during the simulation runtime; and offline after the simulation.

2. The computer-implemented method according to claim 1, wherein at least one scenario includes at least one test of a device used for the at least partially autonomous guidance of a transporter and/or road user.

3. The computer-implemented method according to claim 2, wherein at least one test is determined by at least one parameter which is queried during the simulation runtime and/or at the end of the simulation, wherein parameters include:

scenario parameters comprising at least one of the following features: the number of lanes and/or the width of a lane and/or curves and/or road restrictions and/or the ambient temperature; or driving situation parameters that describe the number and characteristics of moving objects in the scenario, comprising at least one of the following features: the number of road users and/or the number of lane changes in a traffic situation and/or the speed of the road users and/or transporter.

4. The computer-implemented method according to claim 2, wherein transporter and/or road users comprises a first which is vehicle with the system under test (SUT) and a second vehicle which is any other vehicle in the scenario.

5. The computer-implemented method according to claim 1, wherein a KPI plug-in includes a configuration description and a script executable by a computer.

6. The computer-implemented method according to claim 1, wherein for a KPI plug-in executed online, the executable script is automatically started during the simulation runtime and in each simulation step, an evaluation of at least one parameter takes place, so that the evaluation is based on simulation parameters available at runtime and a KPI value is determined from it.

7. The computer-implemented method according to claim 1, wherein for the KPI plug-in executed offline, the executable script is started automatically after the end of the simulation, so that the KPI value is determined based on the simulation results.

8. The computer-implemented method according to claim 1, wherein the currently determined KPI value specifies an evaluation of the current simulation and/or at least one simulation step.

9. The computer-implemented method according to claim 1, wherein the KPI plug-in mechanism contains at least one KPI plug-in and all KPI plug-ins selected in the KPI plug-in mechanism are automatically executed for purposes of simulation and/or test execution.

10. The computer-implemented method according to claim 1, wherein the KPI plug-in is managed in a KPI plug-in pool.

11. A test unit for a computer-implemented method for the evaluation of simulations and/or test cases in scenario-based testing and/or homologation of at least partially autonomous driving functions to be tested by key performance indicators (KPI), wherein KPIs are mapped by KPI plug-ins and KPI plug-ins are selected dynamically and reusably for simulations and/or test cases, and wherein at least one KPI plug-in is selected by a KPI plug-in mechanism in the simulations and/or test cases and is automatically executed by the KPI plug-in mechanism, and wherein the KPI plug-in is adapted to be executed:

online during the simulation runtime; and offline after the simulation.

12. The test unit according to claim 11, wherein the test unit is formed by an electronic control unit (ECU) for which at least one scenario for virtual and/or real tests is determined.

13. A computer program comprising program code to perform the method according to claim 1, when the computer program is executed on a computer.

14. A non-transitory, computer-readable data carrier comprising program code of a computer program to perform the method according to claim 1 when the computer program is executed on a computer.

15. The computer-implemented method according to claim 1, wherein the at least one KPI plug-in is selected from a KPI plug-in pool.

16. The computer-implemented method according to claim 1, wherein the KPI plug-in mechanism is designed to run two different variants of KPI plug-ins.

17. The computer-implemented method according to claim 16, wherein a first variant is executed online and a second variant is executed offline.

18. A computer-implemented method for an evaluation of simulations and/or test cases in scenario-based testing and/or homologation of at least partially autonomous driving functions to be tested by key performance indicators (KPI), the method comprising:

mapping at least one KPI by a KPI plug-in;

selecting, dynamically and reusably, the KPI plug-in for simulations and/or test cases;

selecting at least one KPI plug-in by a KPI plug-in mechanism in the simulations and/or test cases; and automatically executing the selected KPI plug-in by the KPI plug-in mechanism, wherein the KPI plug-in mechanism is designed to run two different variants of KPI plug-ins, and wherein a first variant is executed simultaneously with the simulations and/or test cases and a second variant is executed downstream of a current simulation.

19. The computer-implement method 18, wherein with the first variant an evaluation takes place in each simulation step and a value of the at least one KPI is available immediately after the simulations and/or test cases and with the second variant parameters are not observed real-time during the simulations and/or test cases or used to determine the KPI value and the KPI value is determined after the simulations and/or test cases.

20. The computer-implemented method according to claim 1, further comprising transferring results of the KPI plug-in mechanism, in form of KPI values, back to a test configuration of the test cases to obtain an optimized test creation.

* * * * *